Jan. 5, 1960  S. R. STILES ET AL  2,920,124
ALKYLATION OF HYDROCARBONS WITH IMPROVED MIXING
AND EMULSIFYING OF CATALYST AND REACTANTS
Filed April 14, 1955  2 Sheets-Sheet 2

INVENTORS
SAMUEL R. STILES
JAMES WARBURTON
BY JOHN M. BLACK

H. H. Palmer
ATTORNEYS

ކ2,920,124

Patented Jan. 5, 1960

1

2,920,124

ALKYLATION OF HYDROCARBONS WITH IMPROVED MIXING AND EMULSIFYING OF CATALYST AND REACTANTS

Samuel R. Stiles, Cresskill, and James Warburton, Rutherford, N.J., and John M. Black, Plandome, N.Y., assignors to The M. W. Kellogg Company, Jersey City, N.J., a corporation of Delaware Application April 14, 1955, Serial No. 501,292

10 Claims. (Cl. 260—683.59)

This invention relates to method and means for contacting hydrocarbon liquids, more particularly, it relates to method and means for intimately mixing liquids in an alkylation process. In still another aspect, it relates to method and means for dispersing streams of olefins in a high velocity acid-isoparaffin emulsion.

This application is a continuation-in-part of our copending application Serial No. 387,118, filed October 20, 1953.

One of the major problems in the alkylation of hydrocarbons with olefins in the presence of an acid catalyst is the prevention of the formation of polymers and esters which decrease the yield of alkylate and dilute and contaminate the acid catalyst. In practice, polymer formation is minimized by controlling the ratio of olefin to alkylatable hydrocarbon and by contacting the reactants under conditions of violent turbulence, thereby promoting the alkylation reactions.

It is an object of this invention to provide improved method and means for contacting alkylation reactants.

Another object of this invention is to provide new and useful method and means for introducing olefins into a moving stream of acid-hydrocarbon emulsion.

Still another object of this invention is to provide improved method and means for dispersing olefins in small streams in a moving acid-hydrocarbon emulsion at a point of high emulsion velocity.

These and other objects of this invention will become more apparent from the following detailed discussion and description.

In one aspect of this invention it comprises method and means of intimately mixing hydrocarbon streams. In another aspect it comprises method and means of uniformly dispersing olefin hydrocarbons as a plurality of small streams in an agitated swiftly moving mass of emulsified acid catalyst and isoparaffin hydrocarbons maintained under conversion conditions conducive to the alkylation of said isoparaffins.

This invention is applicable in any alkylation process including the alkylation of paraffins, isoparaffins, aromatics, naphthenes, cyclic compounds, alcohols, etc. with olefinic hydrocarbons. The alkylation reaction takes place over a wide range of temperature ranging from as low as −50° F. when alkylating isoparaffins to as high as about 600° F. when certain aromatic compounds are reacted with olefins. It may be conveniently carried out under pressures at or below atmospheric or as high as several hundred atmospheres. To establish conditions favorable for the production of high octane alkylate in large yields, it is desirable to contact the reactants under conditions of violent agitation, yet provide uniform mixing, and to maintain at the contact point a high concentration of alkylatable hydrocarbon to olefin. This is accomplished herein by introducing finely divided olefinic hydrocarbons into a turbulent moving stream of alkylatable hydrocarbons and acid at the point where the velocity of this stream is high. The reactant ratio at this point is usually very high and may vary between about 2 and about 2000 mols of alkylatable hydrocarbon per mol of olefin.

Numerous catalysts are useful in carrying out the alkylation reactions. Among those better known are the metal halides and the various acid catalysts, including hydrofluoric acid, sulfuric acid, halosulfonic acids, etc. These, however, are only a few of the catalysts which promote alkylation reactions and others such as phosphoric acid and phosphorous pentoxide are also used within the scope of this invention.

In general, this invention accomplishes two valuable results:

(1) By providing better mixing and contact between the reactants it reduces the reaction time and allows the same conversion with fewer reaction stages or a greater conversion with the same number of reaction stages, and (2) By providing for contact of the reactants in such a manner as to give a minimum uniform concentration of olefins at the contact point, polymerization reactions are decreased with a resulting increase in alkylate yield.

The latter aspect of this invention makes it particularly applicable in the alkylation of hydrocarbons with olefins in the presence of sulfuric acid. As mentioned previously, one of the basic problems in acid alkylation is contamination of the acid catalyst with undesirable reaction products, primarily polymers. In order to effectively carry out the alkylation reactions, it is necessary to maintain acid strength at a high level of concentration, namely above 85 percent and preferably above 90 percent. By the method of this invention polymerization of olefins is reduced and sulfuric acid catalyst contamination is decreased with a proportionate decrease in acid consumption and cost of acid recovery. In addition, alkylate yield is increased due to the higher concentration of free olefins in the reaction mixture.

The major alkylation process in use today involves the reaction of isoparaffins, with olefins, in the presence of sulfuric acid to form valuable gasoline components. The isoparaffins used may be isobutane, isopentane, isohexane, etc. or mixtures thereof. Olefins more often reacted are propylenes, butylenes, pentylenes, their isomers and mixtures thereof. It is within the scope of this invention to utilize any proportions of the above as feed stocks and, in addition, mixtures of isoparaffins and olefins with or without the presence of normal paraffins. The subsequent discussion will be directed to the alkylation of isobutane with butylene, however, that is not to be construed in any way as restricting the scope of the invention.

The alkylation of isobutane with butylene in the presence of sulfuric acid is preferably conducted in several stages and at a temperature between about 0° F. and about 100° F. The pressure in the reaction zone is maintained at a level sufficient to keep the reactants in a liquid state, usually between about atmospheric and about 100 p.s.i.g. The ratio of isobutane to olefin feed in each reaction stage, if several stages are used, is preferably maintained between about 2.0 and about 2000 mols per mol and the acid concentration therein is usually maintained between about 0.25 and about 15 volumes of acid per volume of olefin.

In a typical application of this invention, isobutane and sulfuric acid are introduced into an alkylation reaction zone, and are violently agitated to form an emulsion, this being the preferred method of assuring intimate contact between the acid catalyst and the hydrocarbon to be alkylated. Inasmuch as the reaction occurs at the liquid-liquid interface, it is necessary to provide violent agitation if the desired reaction is to take place. The major portion of the isobutane feed is provided by a recycle stream obtained from subsequent distillation steps; any additional quantity of isobutane required, for example, that amount needed to start up the unit, is usually supplied from an independent source. The agitation may be provided in a number of ways, however, usually a conventional mixer or pump provides a means for creating and moving the emulsion at high velocity and also for circulating the emulsion in the contact zone. The alkylation reaction may be carried out in one step, although, more usually, several steps in series are provided with a portion of the olefin reactant being admitted to each stage and contacting isobutane passing serially through the successive stages. The alkylation feed which contains the olefin reactant also contains isobutane, butylene, propane, propylene, and frequently small quantities of lighter paraffins. The temperature in the reaction zone is maintained at a constant low level by vaporizing therefrom the lighter components in the reaction products, more usually a mixture of butane, isobutane, propane, and any lower boiling compounds. Because of the high concentration of isobutane in the reactor liquid these vapors are predominantly isobutane. The vapors are compressed and condensed, and the condensate after the removal of propane and the lighter components is returned to the alkylation reaction zone in the isobutane recycle. The material leaving the last reaction stage comprising a mixture of alkylate, acid and unreacted hydrocarbons passes into a settling zone wherein contaminated acid catalyst, containing polymers and other impurities is separated from the alkylate and unreacted isobutane. A portion of the contaminated acid is recycled to the contacting zone and the remainder is either purified for reuse, used in another process where a high degree of purity is not required, or is discarded. Alkylate and unreacted isobutane are further processed to separate the alkylate, and the isobutane is recycled to the contacting zone.

In the method of this invention the olefins are introduced and uniformally dispersed in the turbulent high velocity acid-hydrocarbon emulsion produced in the mixer in the form of a plurality of small streams. In the usual scale of commercial alkylation operation these streams enter the emulsion with a diameter of between about 1/32 and about 1/2 inch and at a velocity of between about 2 and about 50 feet per second. In an unusually large scale operation, the size of the streams may be somewhat larger and their velocity less and an unusually small operation may involve the use of very small olefin streams with velocities as high or higher than those specified above.

In order to more fully describe the invention and to provide a better understanding thereof, reference is had to the attached drawings of which:

Figure 1:
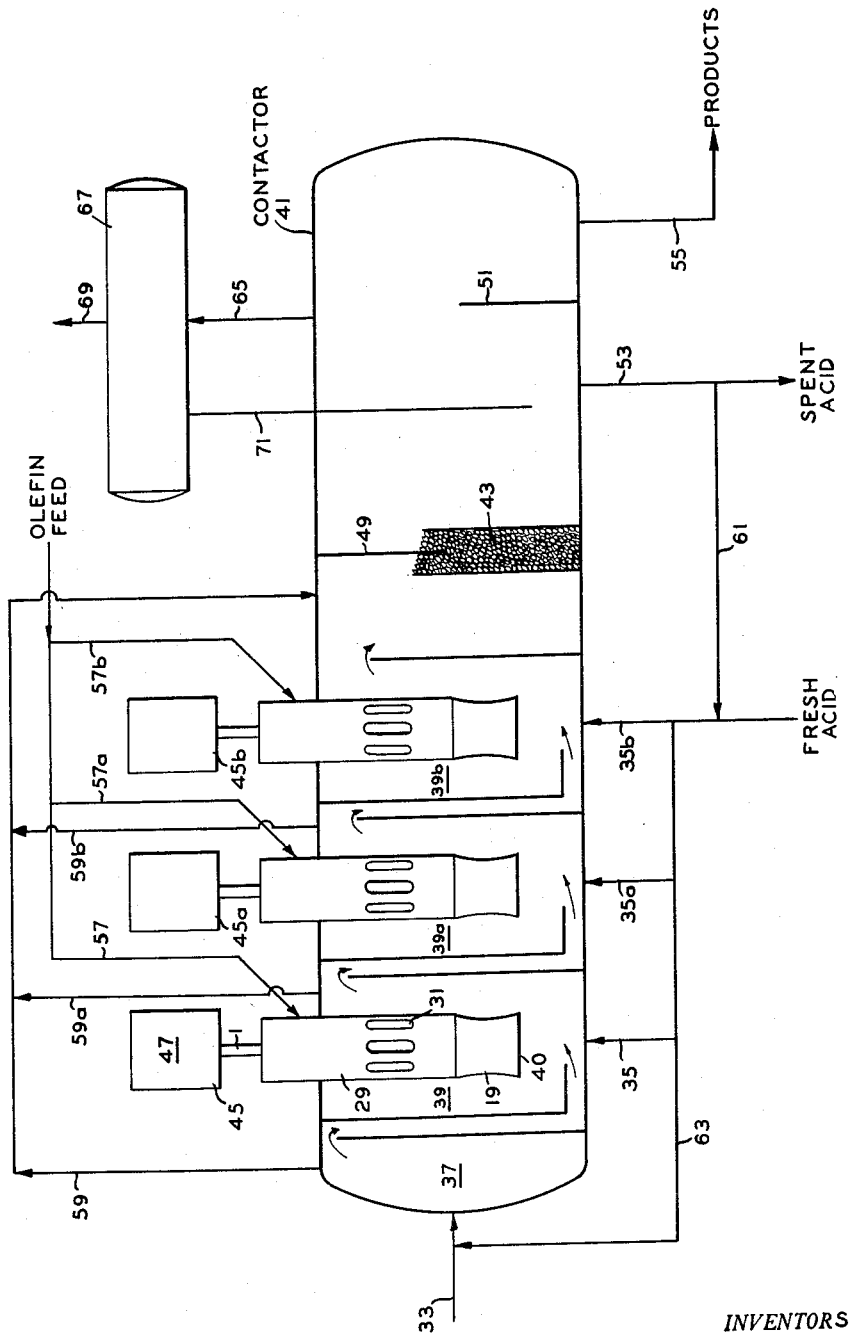
Figure 1 is a diagrammatic illustration of an alkylation contactor drawn in cross-section and Figure 2 is a partial view of a mixing pump shown in Figure 1, also in cross-section.

Referring to the drawings, the alkylation reactions are carried out in a cylindrical elongated closed contacting vessel 41. The interior of approximately 2/3 of the contactor is divided into a number of separate reaction stages or sections 39, 39a and 39b by transverse baffles so arranged that liquid entering the end of the contactor passes from an inlet chamber 37 upward over a baffle down to the bottom of the first reaction section 39, upward through section 39 over a second baffle down to the bottom of the second section 39a and in a similar manner through the third section 39b. Each section contains a mixer 45, 45a and 45b respectively, in this specific illustration propeller type submersible pumps, disposed vertically with the drivers located outside and above the contactor 41 and the propellers located in the lower portion of each reaction section. Each pump is so constructed that material entering the suction thereof is forced upward within the pump casing and then downward and out through openings in the casing into the corresponding reaction section. The pump capacities are such that the quantity of material circulated through each pump is several times greater than the total liquid flow entering the section in which the pump is located.

The alkylation reactants and catalyst enter the contactor 41 at three different points. The alkylation feed comprising a mixture of propane, butane, isobutane, and butylene is split into three streams which enter in mixing pumps 45, 45a and 45b through conduits 57, 57a, 57b respectively. This material passes downward within each pump through a hollow sleeve surrounding the pump shaft and is admitted to the liquid stream flowing through pump downstream of the pump impellers. A mixture of butane and isobutane is admitted to the inlet chamber 37 of the contactor through conduit 33 and the acid catalyst comprising fresh acid or a mixture of fresh acid and contaminated acid is admitted to the bottom of the first reaction section 39 through conduit 35. As illustrated, acid may also be introduced into the succeeding sections 39a and 39b through conduits 35a and 35b; also acid may be combined with the isobutane recycle through conduit 63 prior to the admission of this stream to the contactor.

The hydrocarbon passes from the inlet chamber 37 into the first section 39, is combined with the acid and the mixture enters the suction 49 of pump 45 where it is picked up, emulsified and directed upward at a high velocity. The alkylation feed from conduit 57 is admitted to the emulsion downstream of the pump propeller 13 and the alkylation reaction proceeds immediately and is substantially completed before the reactants leave the pump casing 29. As mentioned before, the capacity of pump 45 and the other pumps is sufficiently great to assure a circulation rate several times as large as the flow of olefin feed, isobutane and acid into section 39. Thus unreacted isobutane is circulated, along with the acid catalyst and a portion of the alkylation product, through the pump a number of times before it passes into the next section where another portion is reacted with fresh olefin feed. The same procedure is followed in section 39b.

The alkylation contactor 41 is maintained at a temperature of about 35° F. and at a pressure of about 3.5 p.s.i.g. Since the acid catalyst and hydrocarbon streams normally enter the contactor above 35° F., it is necessary to provide a method of cooling the reactor to remove the sensible heat in these streams. In addition, the exothermic mixture of the alkylation reaction requires further cooling to remove the heat of reaction and thereby maintain the reaction sections at the required low temperature. In this specific illustration, the cooling is accomplished by autorefrigeration of the reactants and reaction products. In carrying out this operation, vapors are withdrawn from the contactor through conduit 65 into a dry drum 67. Any material settling in the dry drum is returned to the contactor operation zone beneath the acid level through conduit 71. The dry gas from drum 67 enters the suction of a compressor (not shown) through conduit 69, is compressed, condensed, passed to a separation system for the removal of propane and the condensate is returned to the contactor in the isobutane recycle through conduit 33.

A substantial amount of the vaporization which occurs in the contactor takes place in the entrance chamber 37 and the reaction sections 39, 39a and 39b. The isobutane recycle stream enters the contactor as a liquid and at a higher temperature and pressure than that maintained within the contactor. As a result, a portion of this stream flashes in the entrance chamber 37. To prevent a mixture of liquid and vapor from passing into the suction of pump 45, an outlet for this gaseous material is provided through conduit 59. A similar situation prevails in each of the reaction sections, since, in order to remove the reaction heat from each section, it is necessary that a further amount of light material be vaporized therein. This material is supplied partially by the alkylation feed from conduits 57, 57a and 57b, which feed is also introduced at a temperature and pressure higher than that maintained in the contactor. Vapor formed in the reaction section is removed from the contactor through conduits 59a and 59b, is combined with vapor from conduit 59, passes into the upper portion of the contactor downstream of the last reaction section and is withdrawn from the contactor through conduit 65. By this method of operation, heat of reaction, heat of mixing, etc., is removed and a relatively constant temperature is maintained throughout the contactor.

The effluent from the last reaction section comprising a mixture of propane, butane, unreacted isobutane, alkylate and acid passes through an emulsion breaking zone 43 formed by parallel transverse baffles and containing a conventional inert packing material. All of the effluent from the last section is forced to flow through this zone by a deflector baffle 49 extending above the liquid level within the contactor and downward within the emulsion breaking zone. Upon leaving this zone, the acid separates from the hydrocarbon oil and is contained in a settling zone enclosed by baffle 51 over which butane, alkylate and unreacted isobutane flow into the remainder of the contactor. The contaminated acid, containing polymers and other impurities, passes from the contactor through conduit 53 and the alkylate product and unreacted hydrocarbons are removed from the contactor through conduit 55 for further processing (not shown).

For a more detailed illustration of the alkylation mixer, reference is had to Figure 2 which is a sectional view of the portion of the mixer 45 lying below the supporting shell 29. This part of the mixer comprises essentially a venturi-shaped propeller and bearing casing 19, a propeller 13 enclosed therein and a shaft 1 for rotating the propeller. The propeller 13 is located centrally in the throat of casing 19 and the propeller blades are so constructed that rotation of the propeller produces a high degree of turbulence and imparts a tangential and an upward thrust to liquid entering the mixer. The propeller is keyed on shaft 1 at the lower extremity thereof. Movement of the propeller in a downward direction is prevented by a propeller lock nut 15 screwed to the end of the drive shaft and enclosed by cover nut 17 shaped to present a minimum resistance to liquid flow. The lower portion 8 of drive shaft 1 is of a smaller diameter than the upper part 10. Upward movement of the propeller along shaft 1 is prevented by a shaft sleeve 9 which bears against collar 7 which is fitted to the lower portion 8 of the shaft and in turn bears against the upper larger portion of the shaft. Enclosing the shaft sleeve 9 is a bearing bushing 11 which is held in place by a bearing block or bearing housing 5 and the upper portion of which is hollow. The hollowed portion of the housing in turn openly communicates with a hollow shaft casing 3 which encloses drive shaft 1. The entire assembly is maintained centrally within casing 19 by hollow web stator vanes 22 situated above the propeller 13 in the diffusing section of casing 19. Communication is provided between the interior of the stator vanes 22 and the hollow portion of the bearing housing 5 by diagonal passageways 21. The stator vanes 22 are perforated with a plurality of small holes 27, of a diameter of about ¼ of an inch providing communication between the interior and the surface faces of the vanes. Similar holes 23 are also provided from the trailing edges of the vanes to the interiors thereof.

The lower portion of the mixer containing the component parts just described is held to the upper portion by means of a circular series of bolts 2 which fasten the flanged casing 19 to the supporting shell 29. The top portion of shell 29 is closed except for the olefin line 57 which passes through this shell and attaches to the hollow shaft casing 3. The bottom of the supporting shell is closed by an annular tube sheet 26 which contains a circular series of tubes 28 extending in an upward direction within the shell.

The mixture of acid and hydrocarbon, including propane, butane and isobutane entering the first reaction stage 39 is picked up by the propeller 13 and projected upward in a highly turbulent state and at a high velocity. The resulting emulsion enters the diffuser section of casing 19 where the tangential velocity components of the flowing emulsion are converted to longitudinal components thereby providing a higher longitudinal velocity than existed in the region directly adjacent to the propeller 13. Simultaneous with the passage of the emulsion through casing 19 the alkylate feed containing butylene reactant enters the hollow shaft casing 3, passes in a downward direction into the hollow portion of the bearing housing 5, and then through passageways 21 into the hollow stator vanes 22. This material is then introduced through passageways 27 and 23 into the flowing emulsion in the form of fine streams having a diameter of about ¼ inch. Dispersing the alkylate feed in the emulsion in this manner provides a maximum degree of mixing and at the same time a maximum isoparaffin to olefin ratio, thus producing a high rate of reaction and allowing little opportunity for polymerization of the butylene. The openings in the stator vanes 22 may be disposed so as to provide for the entrance of the butylene into the flowing emulsion at any angle, including the perpendicular and substantially parallel flow either in the same direction as, or opposed to the flowing emulsion.

On introduction of the olefin containing feed into the acid-hydrocarbon emulsion the alkylation reactions proceed immediately and continue as the mixture of acid, isobutane and butylene moves upward. Leaving the diffuser section, the reaction mixture enters tubes 28 and passes upward into the supporting shell 29. The purpose of these tubes is to provide time for substantially complete reaction of the butylene before the reactants leave the mixer. The tubes 32 terminate a sufficient distance below the top of shell 29 to allow for reversal of flow in the passage of the reactants and reaction products in a downward direction within the shell 29. The alkylation reaction is highly exothermic and quantities of heat are given off which cause a portion of the reactants to vaporize within the pump. To prevent the accumulation of vapor therein small ports or vent holes (not shown) are provided adjacent to the top of shell 29. The reactant mixture passes downward through the shell and out through discharge ports 31 and then in a downward direction to meet fresh isobutane and acid entering the suction of the pump.

Figure 2:
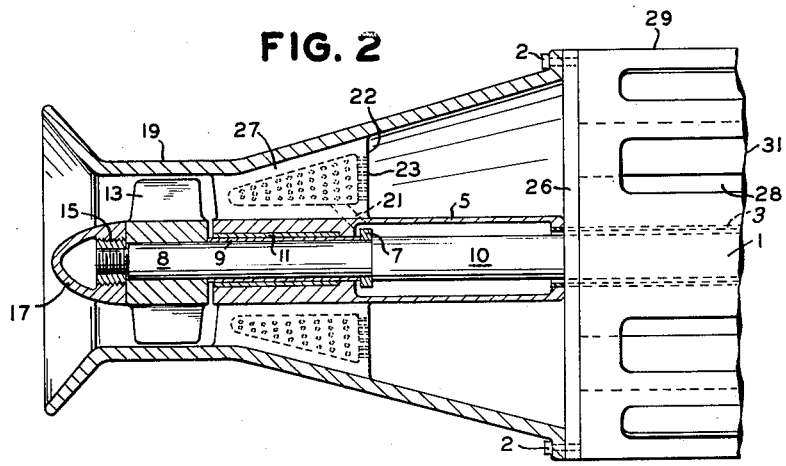
Figure 3:
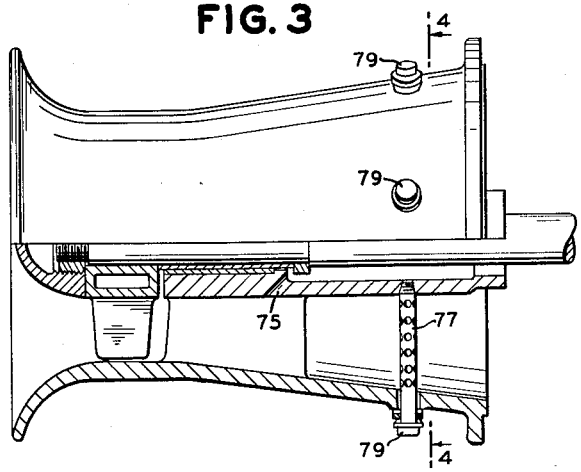
Figure 3 shows an alternate arrangement for injecting the olefin feed, somewhat different from the method of Figure 2.
Figure 4:
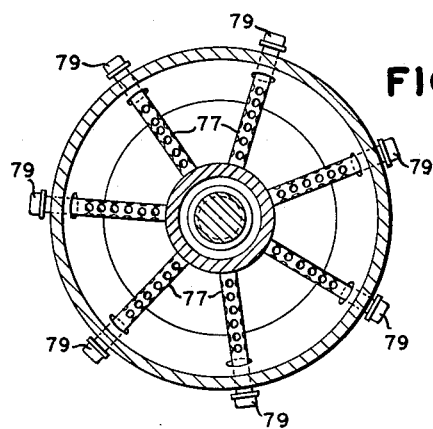
Figure 4 is a section taken through Figure 3 at 4—4.

While the typical illustration presented in Figure 2 is a preferred embodiment, many variations well known to those skilled in the art are applicable within the scope of this invention. An example of another means for producing similar beneficial results is shown in Figures 3 and 4. Referring to Figure 3, the olefin containing feed is introduced into the flowing emulsion through a number of small passageways in sealed conduits 77. The passageways are similar in size and number to those provided in the vanes of Figure 2 and are similarly located to allow admission of the olefin into the emulsion.

at any angle, including the perpendicular and substantially parallel flow either in the same direction as, or opposed to said emulsion. Each of the conduits 77 openly communicates with hollow portion of the bearing housing 5 and is sealed at its opposite extreme by a cap 79. To provide drainage from the bearing housing 5 when the mixer is not in use a passageway 75 is provided from the bottom portion thereof into casing 19. The sectional view in Figure 4 illustrates a particular arrangement of the conduits 77 to provide even distribution of the olefin feed in the emulsion. The physical location of these conduits with respect to their arrangement around the mixer shaft 10 or with relation to their spacing from the mixer impeller 13 may, of course, be varied to suit the particular operation. This specification is intended to embrace not only these variations and the arrangements disclosed in our pending application Serial No. 387,118, filed October 20, 1953, but also other arrangements which would be apparent to one skilled in the art.

Other suitable types of mixers may be used in place of the specific type of mixing means illustrated herein, within the limitation that the olefin be dispersed uniformly in the emulsion in the form of a plurality of small streams and at a point of high emulsion velocity. An example of such a mixer is one in which a turbine impeller is used with stationary baffles arranged around the periphery of the rotating turbine blades. This turbine assembly would be located in the center of the reaction section and would draw emulsion from the bottom of the reactor into the center of the turbine and drive the emulsion horizontally against the stator baffles which deflect the emulsion downward while imparting turbulence and resulting mixing to the emulsion stream. The olefin feed would be introduced to the emulsion in the turbine casing through many small openings along the hollow top stator plate and the hollow deflection baffles or through a distribution ring located inside the circle of the turbine blades with holes pointed outward toward the blades so that feed enters with the flow of emulsion.

Having described the invention by reference to a specific application it should be understood that no undue limitations should be imposed by reason thereof, but that the scope of the invention is defined by the appended claims.

We claim:

1. In an alkylation process in which alkylatable hydrocarbons are reacted with olefins in the presence of an acid catalyst in an alkylation reactor the improvement which comprises emulsifying the acid and alkylatable hydrocarbons, by mechanically propelling the acid and alkylatable hydrocarbon through a confined zone within said alkylation reactor, which confined zone encloses the point of propulsion circulating the emulsion through the confined reaction zone at a high velocity relative to the velocity outside of said confined reaction zone within said reactor, and separately introducing and uniformly dispersing said olefin in said preformed emulsion in a plurality of small streams across the flow path of said emulsion passing upwardly, at a point of maximum linear velocity, whereby the reaction products are obtained with a minimum amount of olefin polymerization.

2. In an alkylation process in which alkylatable hydrocarbons are reacted with olefins in the presence of an acid catalyst in an alkylation reactor the improvement which comprises emulsifying the acid and alkylatable hydrocarbons by mechanically propelling the acid and alkylatable hydrocarbon through a confined zone within said alkylation reactor, which confined zone encloses the point of propulsion, circulating the emulsion through the confined reaction zone at a high velocity relative to the velocity outside said confined reaction zone within said reactor, separately introducing and uniformly dispersing said olefin in said preformed emulsion in a plurality of small streams across the flow path of said emulsion passing upwardly, at a point of maximum linear velocity, allowing liquid alkylation products and a vaporous effluent to form within said confined reaction zone and removing emulsion and alkylation products and separately removing the vaporous effluent from said confined reaction zone whereby the reaction products are obtained with a minimum amount of olefin polymerization.

3. In an alkylation process in which an isoparaffin is reacted with an olefin in a reactor in the presence of sulfuric acid as a catalyst the improvement which comprises emulsifying the acid and isoparaffin by mechanically propelling the acid and isoparaffin through each of a series of confined reaction zones within an alkylation reactor, each of which zones encloses the respective point of propulsion, circulating the emulsion thus formed through each of the confined reaction zones at a velocity higher than the velocity maintained outside of each of said confined reaction zones within said reactor, separately introducing and uniformly dispersing said olefin in said preformed emulsion in a plurality of small streams across the flow path of a molar excess of said emulsion passing upwardly, at a point of maximum linear velocity within each zone, forming liquid alkylation products and a vaporous effluent within each of said confined reaction zones, removing emulsion and alkylation products and separately removing vaporous effluent from each of said confined reaction zones, and successively passing said emulsion and alkylation product through said reactor and each of said confined reaction zones.

4. In an alkylation process in which an alkylatable hydrocarbon is reacted with an olefin in the presence of an acid catalyst in an alkylation reactor the improvement which comprises emulsifying the acid and alkylatable hydrocarbon by mechanically propelling the acid and alkylatable hydrocarbon through a confined reaction zone within said alkylation reactor, which confined zone encloses the point of propulsion; on the downstream side of the point of propulsion, converting the turbulent flow of emulsion to a path of linear flow; circulating the emulsion through the confined reaction zone at a high velocity relative to the velocity outside of said confined zone within said reactor; and separately introducing and uniformly dispersing said olefin in said preformed emulsion in a plurality of small streams across the flow path of said emulsion passing upwardly, at a point of maximum linear velocity, whereby the liquid reaction products are obtained with a minimum amount of olefin polymerization.

5. In a mixing device a rotor provided with an elongated drive shaft, means disposed around said drive shaft providing a plurality of elongated passageways parallel to each other and said drive shaft with one set of open ends located above said rotor and in a position to receive a fluid discharged therefrom, a rotor casing surrounding said rotor and arranged to confine a first fluid discharged from said rotor and direct said fluid into said plurality of parallel passageways, a shaft casing enclosing said drive shaft and providing with said shaft an annular passageway terminating at one end thereof between the discharge side of said rotor and the open end of said parallel passageways, and means for introducing a second fluid into said annular passageway; hollow distributor means located in said rotor casing between said rotor and said plurality of parallel passageways extending across the path of flow of fluid discharged from said rotor, said distributing means communicating with the interior of said shaft casing and being provided with ports along substantially the entire dimension thereof, perpendicular to said path of flow, for mixing the second fluid with fluid discharged from said rotor prior to flowing fluids to said plurality of elongated passageways, said second fluid being supplied from said annular passageway.

6. In a mixing device comprising a rotor for propelling a first fluid, a drive shaft for said rotor, a rotor casing surrounding said rotor and concentric with said drive shaft, a shaft casing enclosing said drive shaft and providing with said shaft an annular passageway, bearing means mounted in the lower end of said shaft casing and engaging said drive shaft, means for introducing a second fluid into said annular passageway, and vanes extending from said shaft casing to said rotor casing and adjacent said bearing means for mounting said rotor within said rotor casing, means for introducing said second fluid into the stream of said first fluid discharged by said rotor comprising a plurality of tubular members extending through said rotor casing and said shaft casing, removable closure means mounted on the outer end of said tubular members, and a plurality of orifices distributed substantially along the entire length of said tubular members across the path of flow of said first fluid discharged by said rotor to provide communication between said annular passageway and said stream of fluid discharged by said rotor whereby said second fluid discharged from said annular passageway through said tubular members is intimately mixed with said first fluid at the velocity imparted to it by the vanes.

7. In a mixing device comprising a rotor for propelling a first fluid, a drive shaft for said rotor, a plurality of elongated passageways parallel to each other and said drive shaft with one set of open ends located above said rotor and in a position to receive a fluid discharged therefrom, a rotor casing surrounding said rotor concentric with said drive shaft, and arranged to confine the first fluid discharged from said rotor and direct said fluid into said plurality of parallel passageways, a shaft casing enclosing said drive shaft and providing with said shaft an annular passageway, bearing means mounted in the lower end of said shaft casing and engaging said drive shaft, means for introducing a second fluid into said annular passageway, and vanes extending from said shaft casing to said rotor casing and adjacent said bearing means for mounting said rotor within said rotor casing, means for introducing said second fluid into the stream of said first fluid discharged by said rotor comprising a plurality of tubular members extending through said rotor casing and said shaft casing, removable closure means mounted on the outer end of said tubular members, and a plurality of orifices distributed substantially along the entire length of said tubular members across the path of flow of said first fluid discharged by said rotor to provide communication between said annular passageway and said stream of fluid discharged by said rotor whereby said second fluid discharged from said annular passageway through said tubular members is intimately mixed with said first fluid at the velocity imparted to it by the vanes.

8. In a mixing device comprising a rotor for propelling a first fluid, a drive shaft for said rotor, a plurality of elongated passageways parallel to each other and said drive shaft with one set of open ends located above said rotor and in a position to receive a fluid discharged therefrom, a rotor casing surrounding said rotor and said elongated passageways concentric with said drive shaft and said elongated passageways and arranged to confine the first fluid discharged from said rotor, to direct said fluid through said plurality of parallel passageways and to eject emulsion and alkylate product from said mixing device after leaving said parallel passageways through vents in the upper portion of said rotor casing, a shaft casing enclosing said drive shaft and providing with said shaft an annular passageway, bearing means mounted in the lower end of said shaft casing and engaging said drive shaft, means for introducing a second fluid into said annular passageway, and vanes extending from said shaft casing to said rotor casing and adjacent said bearing means for mounting said rotor within said rotor casing, means for introducing said second fluid into the stream of said first fluid discharged by said rotor comprising a plurality of tubular members extending through said rotor casing and said shaft casing, removable closure means mounted on the outer end of said tubular members, and a plurality of orifices distributed substantially along the entire length of said tubular members across the path of flow of said first fluid discharged by said rotor to provide communication between said annular passageway and said stream of fluid discharged by said rotor whereby said second fluid discharged from said annular passageway through said tubular members is intimately and uniformly mixed with said first fluid at the maximum velocity imparted to it by the vanes.

9. In a mixing device a rotor provided with an elongated drive shaft, means disposed around said drive shaft providing a plurality of elongated passageways parallel to each other and said drive shaft with one set of open ends located above said rotor and in a position to receive a fluid discharged therefrom, a rotor casing surrounding said rotor and arranged to confine a first fluid discharged from said rotor and direct said fluid into said plurality of parallel passageways, a shaft casing enclosing said drive shaft and provided with said shaft an annular passageway terminating at one end thereof between the discharge side of said rotor and the open end of said parallel passageways, means for introducing a second fluid into said annular passageway, vanes extending from said shaft casing to said rotor casing intermediate said rotor and said elongated passageways, means for introducing said second fluid into the stream of said first fluid discharged by said rotor comprising a tubular member intermediate said vanes and said elongated passageways extending through said shaft casing, and a plurality of orifices distributed substantially along the entire length of said tubular member arranged to distribute said second fluid uniformly to direct said second fluid against and across the path of flow of said first fluid discharged by said rotor to provide communication between said annular passageway and said stream of fluid discharged by said rotor whereby said second fluid discharged from said annular passageway through said tubular member is intimately mixed with said first fluid at the velocity imparted to it by the vanes.

10. A mixing device comprising in combination a rotor provided with an elongated drive shaft, means disposed around said drive shaft providing a plurality of elongated passageways parallel to each other and said drive shaft with the lower set of open ends located above said rotor and in a position to receive a fluid discharged therefrom, and the upper set of open ends adapted to eject fluid after passing through the length of said elongated passageways, a rotor casing surrounding said rotor and arranged to confine a first fluid discharged from said rotor and direct said fluid into said plurality of parallel passageways, said rotor casing having outlet vents located between the upper and lower ends of said elongated passageways to pass reactants and products leaving the elongated passageways out of the mixer, a shaft casing enclosing said drive shaft and providing with said drive shaft an annular passageway terminating at one end thereof between the discharge side of said rotor and the lower open ends of said parallel passageways and means for introducing a second fluid into said annular passageway, hollow distributor means located in said rotor casing between said rotor and the lower open ends of said parallel passageways extending across the path of flow of fluid discharged from said rotor, said distributing means communicating with the interior of said shaft casing and being provided with ports along substantially the entire dimension thereof, perpendicular to said path of flow for mixing a second fluid with fluid discharged from said rotor prior to flowing fluids to said plurality of elongated passageways, said second fluid supplied from said annular passageway.

(References on following page)

References Cited in the file of this patent

UNITED STATES PATENTS

| | | | |
|---|---|---|---|
| 1,830,356 | Ford | Nov. 3, | 1931 |
| 2,042,798 | Olson | June 2, | 1936 |
| 2,238,802 | Altshuler et al. | Apr. 15, | 1941 |
| 2,263,534 | Aldridge | Nov. 18, | 1941 |
| 2,380,245 | Keith et al. | July 10, | 1945 |
| 2,389,604 | Dowding | Nov. 27, | 1945 |
| 2,429,205 | Jenny et al. | Oct. 21, | 1947 |
| 2,454,869 | Goldsby et al. | Nov. 30, | 1948 |
| 2,459,636 | Fenney | Jan. 18, | 1949 |
| 2,474,924 | Watson et al. | July 5, | 1949 |
| 2,720,447 | Jones et al. | Oct. 11, | 1955 |
| 2,772,863 | Harney et al. | Dec. 4, | 1956 |